(12) United States Patent
Hughes

(10) Patent No.: US 8,484,379 B2
(45) Date of Patent: *Jul. 9, 2013

(54) METHOD AND SYSTEM FOR TRANSFERRING INFORMATION

(75) Inventor: Marvin E. Hughes, Mount Vernon, NY (US)

(73) Assignee: E C Enabler, Ltd, New York, NY (US)

( * ) Notice: Subject to any disclaimer, the term of this patent is extended or adjusted under 35 U.S.C. 154(b) by 2155 days.

This patent is subject to a terminal disclaimer.

(21) Appl. No.: 11/112,070

(22) Filed: Apr. 22, 2005

(65) Prior Publication Data

US 2006/0253540 A1     Nov. 9, 2006

Related U.S. Application Data

(63) Continuation of application No. 09/329,769, filed on Jun. 10, 1999, now Pat. No. 6,889,260.

(51) Int. Cl.
*G06F 15/16* (2006.01)
(52) U.S. Cl.
USPC .......................................... 709/246; 709/247
(58) Field of Classification Search
USPC ................... 709/207; 707/2; 717/107
See application file for complete search history.

(56) References Cited

U.S. PATENT DOCUMENTS

| | | | | |
|---|---|---|---|---|
| 5,440,744 A | * | 8/1995 | Jacobson et al. | 709/203 |
| 5,517,662 A | * | 5/1996 | Coleman et al. | 709/201 |
| 5,619,710 A | * | 4/1997 | Travis et al. | 709/203 |
| 5,966,531 A | * | 10/1999 | Skeen et al. | 719/315 |
| 5,970,475 A | | 10/1999 | Barnes et al. | |
| 5,983,267 A | * | 11/1999 | Shklar et al. | 709/217 |
| 5,987,256 A | * | 11/1999 | Wu et al. | 717/146 |
| 6,014,670 A | * | 1/2000 | Zamanian et al. | 707/101 |
| 6,026,474 A | * | 2/2000 | Carter et al. | 711/202 |
| 6,085,198 A | * | 7/2000 | Skinner et al. | 707/103 R |
| 6,134,559 A | * | 10/2000 | Brumme et al. | 707/103 R |
| 6,151,584 A | * | 11/2000 | Papierniak et al. | 705/10 |
| 6,216,131 B1 | * | 4/2001 | Liu et al. | 707/102 |
| 6,226,675 B1 | * | 5/2001 | Meltzer et al. | 709/223 |
| 6,253,193 B1 | * | 6/2001 | Ginter et al. | 705/57 |
| 6,377,953 B1 | | 4/2002 | Gawlick et al. | |
| 6,381,628 B1 | * | 4/2002 | Hunt | 709/201 |
| 6,385,644 B1 | * | 5/2002 | Devine et al. | 709/206 |
| 6,473,794 B1 | * | 10/2002 | Guheen et al. | 709/223 |

(Continued)

OTHER PUBLICATIONS

U.S. Appl. No. 60/121,527, filed Feb. 25, 1999, entitled "Expert System to Build and Deploy Coherent Network Distributed Object" Application Appendix A and B by Williams; Mark.*

(Continued)

*Primary Examiner* — Ninos Donabed
(74) *Attorney, Agent, or Firm* — Michael D. Carbo

(57) ABSTRACT

A method and system for application-to-application data exchange which provides data conversion from the format of a source application to the format of a target application upon receipt of data by the target application. To achieve compatibility among applications exchanging data, the preferred system uses a standard set of terms and process names for building metadata packets that inform both applications as to their respective data representation. A metadata packet includes a standard name and application specific data format, as well as an optional associated process name. Source metadata provided in connection with source application-specific data enables the conversion of the source format to the format compatible with the target. This method eliminates data conversion at the source application.

9 Claims, 19 Drawing Sheets

U.S. PATENT DOCUMENTS

| | | | |
|---|---|---|---|
| 6,487,547 B1* | 11/2002 | Ellison et al. | 707/2 |
| 6,496,865 B1 | 12/2002 | Sumsion et al. | |
| 6,507,833 B1* | 1/2003 | Hichwa et al. | 707/1 |
| 6,549,916 B1* | 4/2003 | Sedlar | 707/200 |
| 6,591,272 B1* | 7/2003 | Williams | 707/102 |
| 6,594,653 B2* | 7/2003 | Colby et al. | 1/1 |
| 6,606,708 B1* | 8/2003 | Devine et al. | 726/8 |
| 6,629,138 B1* | 9/2003 | Lambert et al. | 709/224 |
| 6,631,402 B1* | 10/2003 | Devine et al. | 709/217 |
| 6,714,979 B1* | 3/2004 | Brandt et al. | 709/225 |
| 6,769,124 B1* | 7/2004 | Schoening et al. | 719/316 |
| 6,820,266 B1* | 11/2004 | Minakawa et al. | 719/313 |
| 7,529,825 B1* | 5/2009 | Freskos et al. | 709/223 |
| 7,873,742 B1* | 1/2011 | Orvendal et al. | 709/236 |
| 7,941,553 B2* | 5/2011 | Baumeister et al. | 709/231 |
| 8,006,177 B1* | 8/2011 | Meltzer et al. | 715/234 |
| 8,214,329 B2* | 7/2012 | Gilder et al. | 707/622 |
| 2004/0019696 A1* | 1/2004 | Scott et al. | 709/242 |

OTHER PUBLICATIONS

U.S. Appl. No. 60/121,527, filed Feb. 25, 1999, entitled Expert System to Build and Deploy Coherent Network Distributed Object Application, by Williams; Mark.*

* cited by examiner

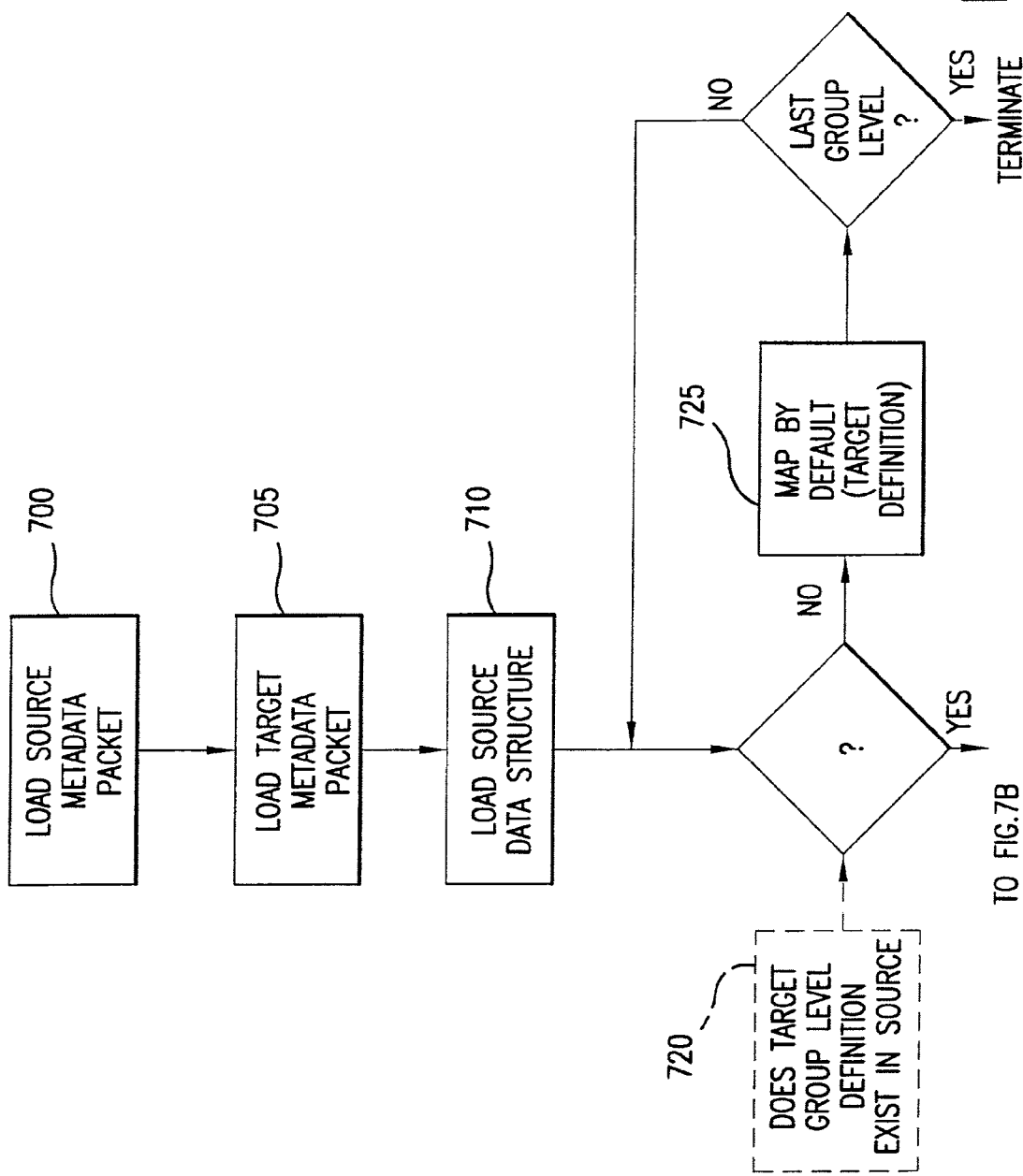

METHOD AND SYSTEM FOR TRANSFERRING INFORMATION

This is a continuation, of application Ser. No. 09/329,769, filed Jun. 1, 1999.

FIELD OF THE INVENTION

This invention relates to transferring data from one computer application to another, including applications using different data formats.

BACKGROUND OF THE INVENTION

Electronic exchange of information is rapidly growing in significance for both businesses and individuals. Although communications infrastructure is available for transporting electronic messages, due to incompatible data formats of many applications, there are significant obstacles to exchanging electronic data dynamically, flexibly and easily. Paper-based transactions still persist even though they are slow and cumbersome, because paper documents are easily understood and available to most people engaged in commerce of any sort. This is not the case with computer data, because computer applications employing different data formats cannot interpret incompatible data.

To unify data formats employed by computer applications, the electronic data interchange (EDI) standard has been developed. This standard, however, has not been widely accepted because it does not effectively facilitate electronic transactions. The EDI standard enforces a specific data format and requires each participant to an electronic transaction to output its data in the format consistent with the standard. To conform to the standard, users typically need to modify their applications and databases, which are inordinate tasks. To complicate the matter further, when the standard changes it is frequently necessary to alter user applications and convert their databases again to accommodate new features. Thus, the currently available standard is so cumbersome and expensive to implement and use that it does not meet the needs of a broad community of users that require electronic exchange of information.

Also, due to the great expense associated with modifying the existing standard, it is unduly rigid and does not dynamically adapt to the constantly changing commercial environment. Because the standard dictates the types of transactions that can be implemented through electronic data transfers, it severely limits business practices.

Accordingly, there is a need for a system and method of exchanging information among diverse applications that is based on a standard which is readily adaptable to changing commercial environments. Also, there is a need for a system that does not require complex, time consuming and error-prone modifications of the existing applications and databases in order to facilitate information exchange. Furthermore, there is a need for a standard and associated methods and system that can be readily adapted by a broad community of users who desire to exchange information.

SUMMARY OF THE INVENTION

The preferred embodiment of this invention provides a novel method and apparatus for readily and effectively exchanging electronic information between heterogenous applications. The preferred embodiment employs a new standard providing consistent names for data elements (e.g., data structure entries, fields of records, etc.) and associated processes. The standard enables users to define data relationships and specify data manipulation protocols so as to facilitate information exchange without changing existing computer applications, even if they use different data formats. In addition, the preferred embodiment minimizes the need for extensive "setup" time and arrangements before initiating electronic data exchanges among heterogeneous applications. Furthermore, the process-oriented standard of the preferred embodiment is well-suited for implementation using object technology and metadata management of open system architectures.

More specifically, the system and method of the preferred embodiment employ repositories of standard terms and standard process names. The standard terms (also referred to as "standard names") define data elements that are commonly transmitted by applications and the process names define processes commonly used in connection with such data elements, e.g., functions that validate data. For each data element that can be transmitted by an application, the preferred system builds a metadata packet entry that defines the data element such that it is readily "understood" and interpreted by other applications employing a different data format. A collection of such metadata packet entries forms a metadata packet that defines a data structure, a record, or another collection of related data. In the discussion below, all such collections of application's related data may be referred to as data structure.

Metadata packet entries include standard names coupled with application-specific data format definitions. If a given data element defined by a metadata entry is associated with a function (e.g., with a validation procedure), a metadata packet entry may also include such standard function names. The names (also referred to as "terms") in a metadata packet are readily understood by another application having access to the same standard repositories, and because application-specific data formats are defined as part of each metadata packet, incoming data can be readily converted to the format consistent with a recipient (target) application.

The process of building metadata packets is incomparably easier than modifying applications, as customarily done in the prior art, because the existing data structures of the application do not need to change. After metadata packets have been defined and stored for each communicating application, the applications can transfer data without regard for specific data formats used by the recipients.

To transmit information, the source application (i.e., the application that transmits data) sends both actual data elements formatted in accordance with the source—application format and the corresponding one or more metadata packets. (As noted, a metadata packet represents, for example, a data structure or a record). At the target end (e.g., at the system supporting the target application that receives data), the received source data can be readily converted for input to the target application because the source and target metadata packets use the same standard terms and their respective data formats are defined by metadata. In the preferred embodiment, the conversion of the data transmitted by the source application to the format compatible with the target application is target-data-structure driven. That is, target metadata is retrieved and matched with the corresponding source data structure defined by the source metadata. In the event that certain data elements required by the target application are not included in the source data structure defined by the source metadata packet, a default value is supplied during the data conversion. Thus, the resultant converted data is compatible with the target application.

Accordingly, to communicate information, a source application does not perform any data conversion and does not even need to "know" what data format is compatible with the target application. Advantageously, the data structures in the source and target systems remain unchanged, while the metadata provides effective communication among applications.

It is apparent that the method and system of the preferred embodiment provides a dramatic improvement over current practices. The preferred standard uses only standard names and does not impose specific data formats. Due to its simplicity, the standard can dynamically change so as to stay current and consistent with business practices. Users can readily adapt to the changes in the standard by building new metadata packets and without changing their applications software. Another one of many advantages of the preferred method and system is that different applications that use incompatible data representations can communicate without converting data to another representation regardless of specific representations compatible with intended recipients. This mode of communication is possible-because the transmitted data is converted at the target end of the data transfer based on the transmitted one or more metadata packets.

It should also be noted that the method and system of the preferred embodiment is not limited to supporting information exchange by remotely located source and target applications, wherein the corresponding source and target systems communicate over a network. It can, for example, be employed within the same system and within the same application. Also, as understood by a person skilled in the art, the preferred method and system are not limited to commercial transactions and can be employed in a vast variety of applications without any limitation to a specific area.

BRIEF DESCRIPTION OF THE DRAWINGS

FIG. 7A-C illustrates the functions performed by the process engine during data conversion.

DETAILED DESCRIPTION OF THE PREFERRED EMBODIMENTS

Figure 1:
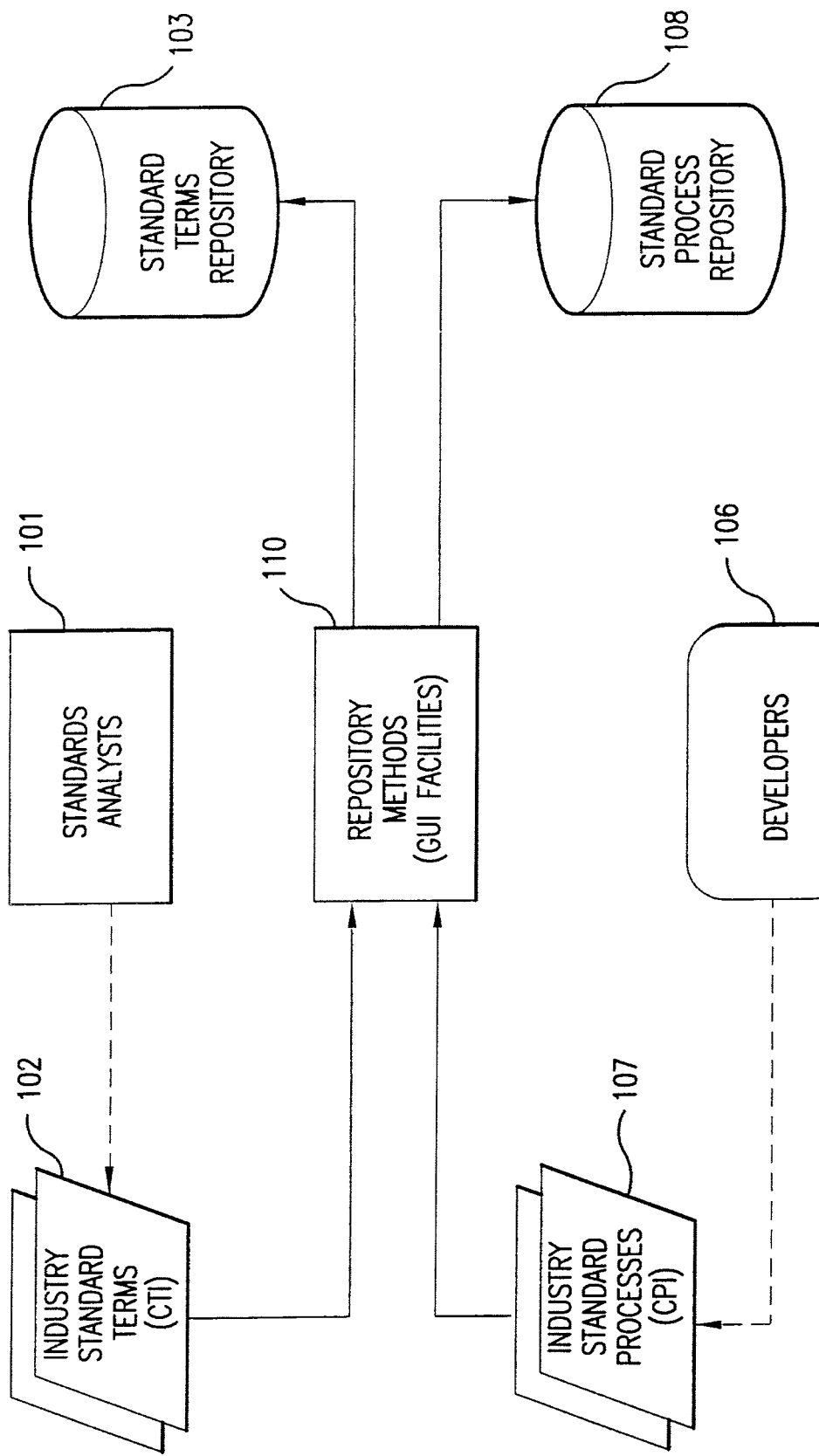
FIG. 1 illustrates establishing and maintaining repositories of standard terms and process names.

The preferred embodiment employs repositories of standard terms (or names) and standard process names that enable applications having incompatible names and data formats to communicate with each other without converting their data structures to a different format. FIG. 1 illustrates a preferred way of constructing and maintaining these repositories of standard information. Standards analysts (see 101) are individuals who study various sources of relevant information and define and enhance the standard. They are preferably provided with a graphical user interface (GUI) 110 for entering and maintaining the lexicon of the standard. The terms and process names approved by the analysts are then stored in the term and process repositories, illustrated at 103 and 108, respectively. Updated repositories of standard terms and process names are periodically distributed to all the participants that use the preferred method of data exchange.

The standard terms stored in repository 103 reflect frequently used data elements and the process names stored in repository 108 identify the processes commonly used in connection with these data elements. For example, such processes may be used for data validation and manipulation. In deciding which terms to include in the standard, the analysts consider paper and electronic documents commonly used in commerce and other uses of data transfers, event logs, file specifications and other relevant sources. Software developers 106 may identify standard processes and supply their names for inclusion into the process name repository 108 by standards analysts 101. The repositories of standard terms 103 and process names 108 are preferably not linked and, therefore, provide independent collections of reference data. The names selected for the terms and process names of the standard preferably resemble natural language terms reflecting their intended use.

Figure 2:
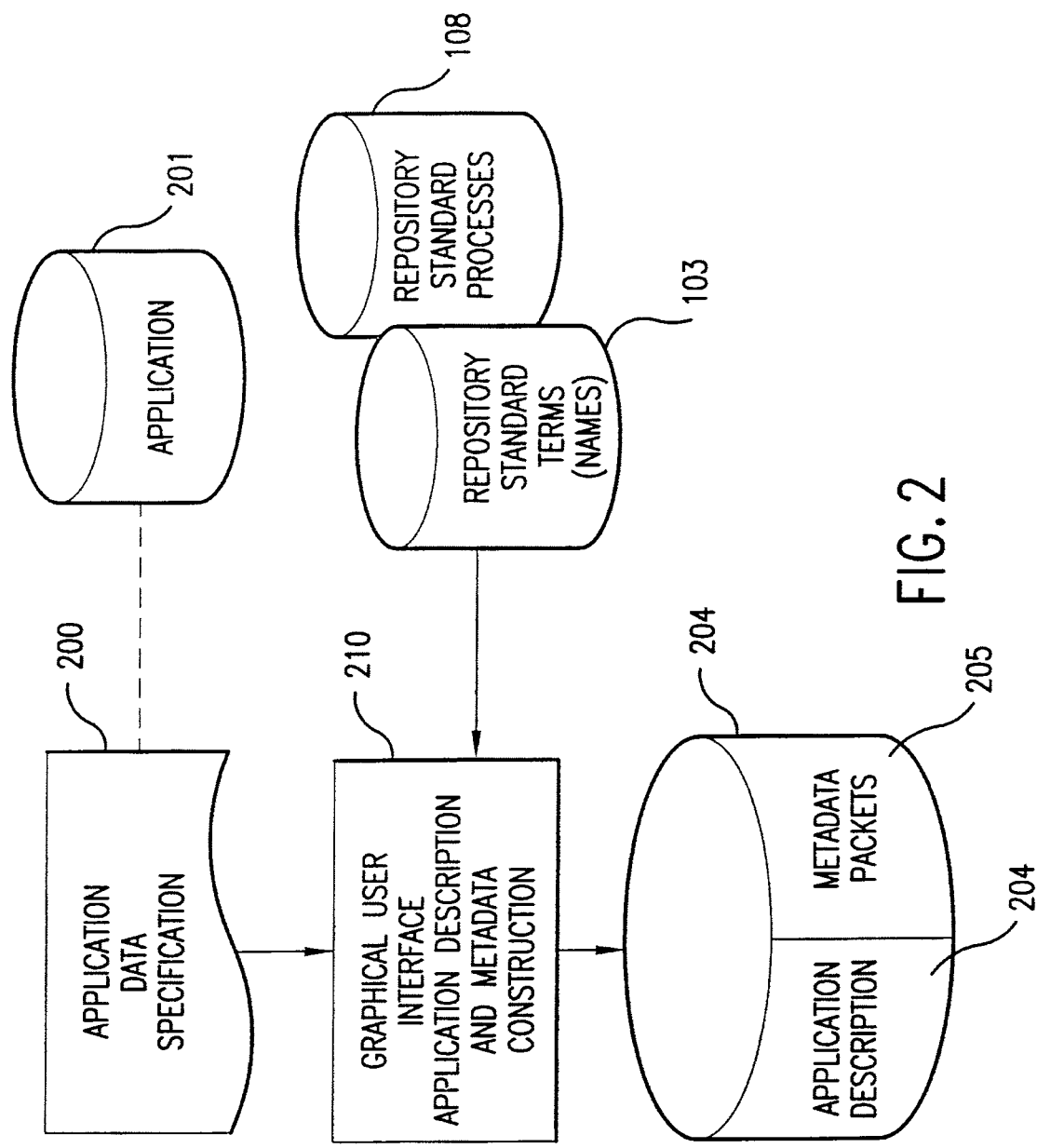
FIG. 2 illustrates the construction of metadata packets.

FIG. 2 illustrates how application-specific data structures are represented as metadata packets comprising standard terms and process names coupled with application-specific data formats. The metadata building process is implemented on a computer system, e.g., a personal computer, as a separate program or a collection of programs as understood by a person skilled in the art. To facilitate data exchange among heterogenous applications, each application intending to communicate with other applications should undergo the process of building metadata packets. Notably, the metadata building process does not translate data structures of the applications to a different format; only the names of data elements should be translated to the terms of the standard.

A specific user application is illustrated as 201. Data structures of an application are described, for example, using conventional record/file layouts, database table definitions or using other techniques known in the art. In FIG. 2, application data specification 200 describes the data structures of the application 201. The metadata building process is supported by a graphical user interface (GUI) 210 that facilitates correlating application-specific data elements with the standard terms and process names.

Application data specification 200, which for example can be derived from data names, specific data formats (e.g., lengths) and the overall data structure configuration (e.g., file organization), is entered by a user with the aid of GUI 210, and then stored as application description 204. Thereafter, standard terms and process names from the repositories 103 and 108 are matched with the application-specific definitions so as to construct metadata packets. Interface 210 facilitates the assignment of standard terms and process names to the data elements of the application. As a result, the system supporting this process generates one or more metadata packets comprising standard terms correlated to application-specific data formats and selected standard process names. The resultant metadata packets are stored as illustrated at 205.

Figure 3:
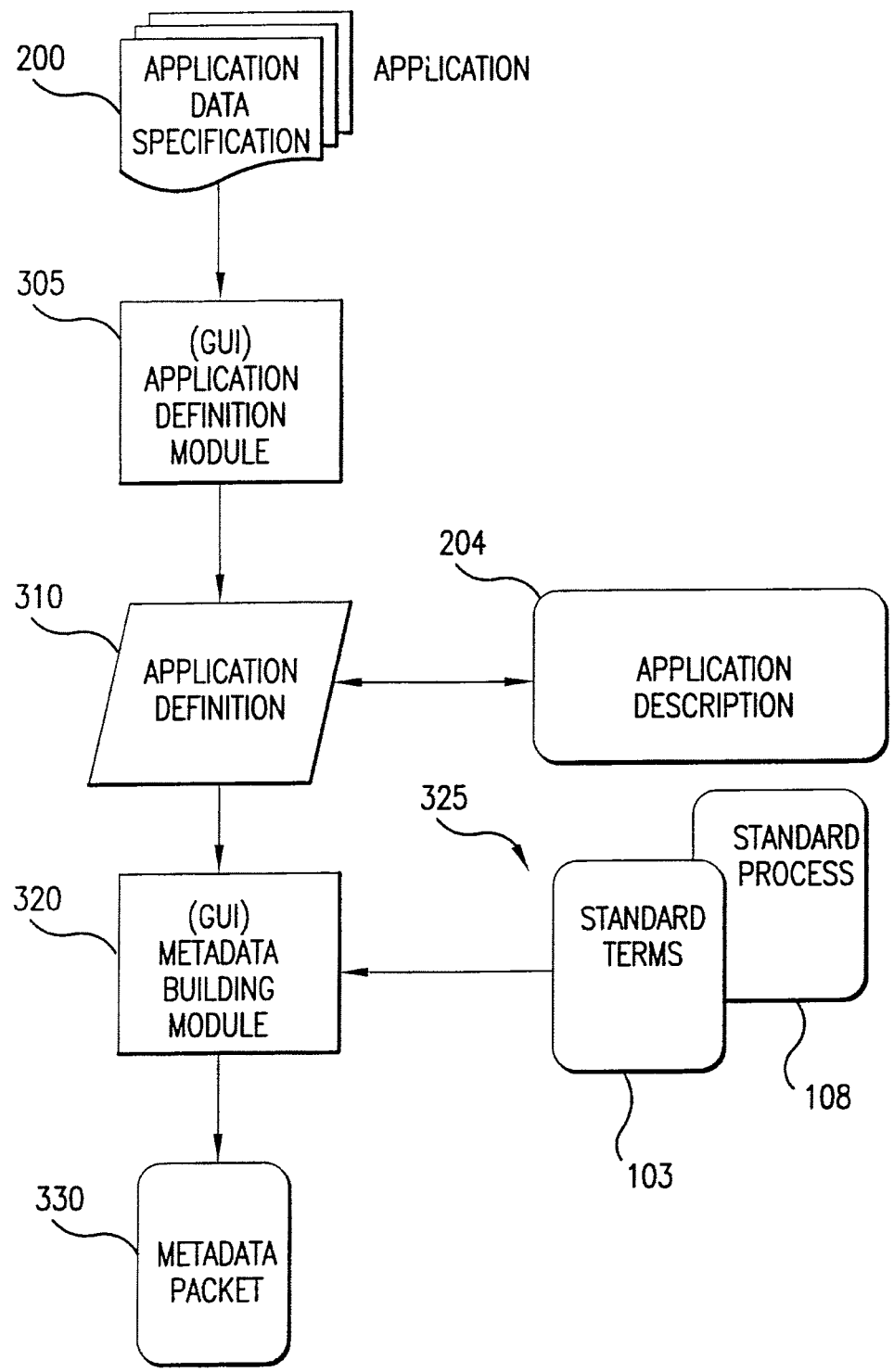
FIG. 3 illustrates the construction of metadata packets in further detail.

FIG. 3 illustrates the process of building metadata packets discussed in connection with FIG. 2 in further detail. At 305 of FIG. 3, application definition module (ADM) presents graphical templates to a user building metadata packets who, first, enters application data specification 200, for example, using a keyboard. At 310, the ADM builds definitions of application-specific data structures on the basis of the user-supplied data and stores them as application description 204. The definitions stored as application description 204 include names of data elements, specifications of data formats (e.g., lengths of fields and the associated offsets), corresponding process names, and may also include other information that defines application data structures as known in the art.

Then, at 320, metadata building module (MBM) displays a template with the previously entered definitions of the application description as well as another template with standard terms and process names stored in the repositories 103 and 108. Preferably, the application description is organized by transaction type of the defined data structures. For example, the transaction type of a data structure can be "Purchase Order" as illustrated in the exemplary data structure 820 of FIG. 8. The standard repositories 103 and 108 also preferably identify transaction types that the standard names may relate to. Accordingly, the metadata building system preferably displays standard terms and process names that generally relate to the transaction type of the currently-displayed-description of the application-specific data structure.

The user then assigns selected terms and process names from the standard repositories to the application-specific definitions using graphical prompts as known in the art. As a result, the standard terms and process names represent the lexicon in the particular application. At 330, for each application-specific term in the application definition, the metadata building module constructs an entry of a metadata packet comprising application-specific data specification joined with the corresponding standard terms and optional process names. The metadata packet entries corresponding to data elements of each application-specific data structure are then combined into a metadata packet. The packets are then stored as illustrated at 205.

As noted, the terminology of the standard is preferably selected so that the standard names resemble natural language thereby simplifying the process of matching application-specific and standard terms. As apparent from the above discussion, the standard terms (names) are selected based on the lexicon, without considering application-specific data formats. That is, only the terms used by the application are matched to the standard terms, but application-specific data formats do not need to be converted to another "standard" format. Also, it should be noted that the process of matching application-specific terms to standard terms so as to build metadata packets is not concerned with data structures employed by any intended recipient of information (target application). As understood by a person skilled in the art, the constructed metadata packets can also be employed for computer applications unrelated to electronic data transfer. The metadata discussed herein can, for example, be used for initiating and monitoring remote processing tasks, performing data display and retrieval functions that are currently performed by browsers, as well as for a variety of other applications as understood by a person skilled in the art.

Figure 4A:
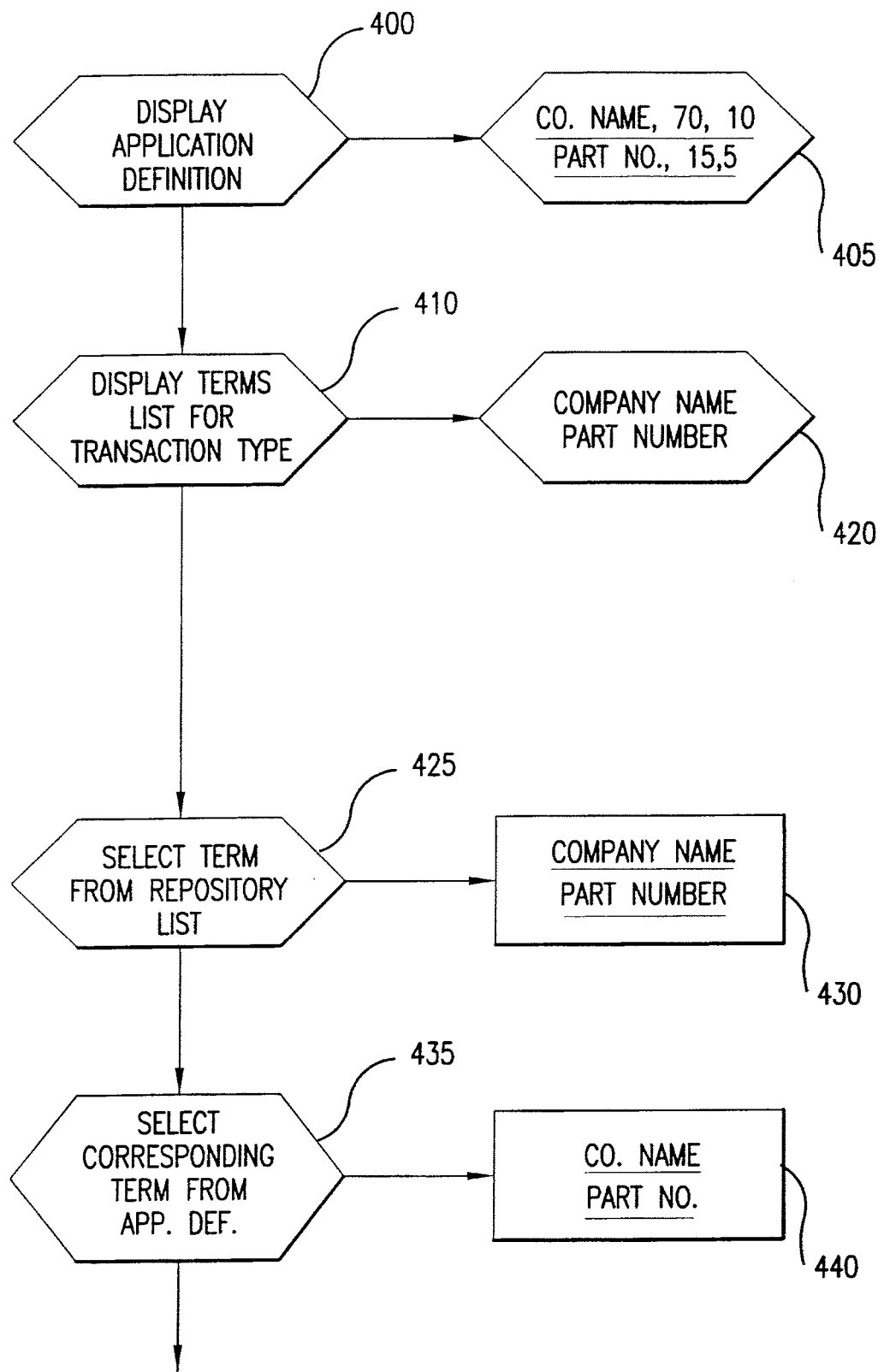
FIGS. 4A and 4B illustrate an example of the metadata packet entries construction process.
Figure 4B:
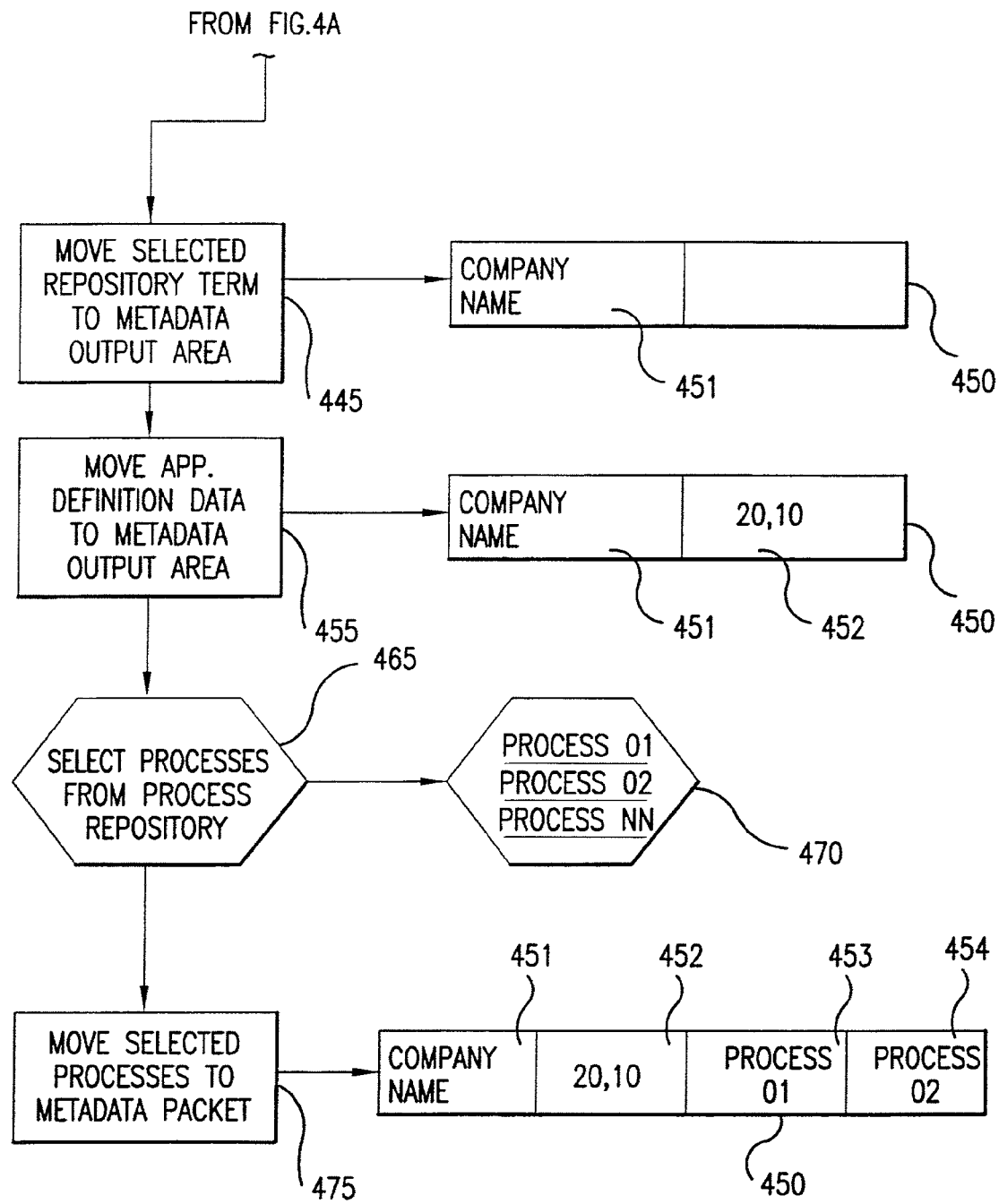

FIGS. 4A and 4B provide an example of the metadata building process discussed above in connection with FIGS. 2 and 3. At 400, at least some of the application-specific data definitions that define data elements are displayed to the user. An example of such definitions is provided at 405. The definition of this example includes a company name "Co. Name," having application-specific data format defined as 70 and 10 and "Part No." formatted in this application as 15 and 5. Note that "Co. Name" and "Part No." are application-specific names and "70, 10" and "15, 5" are application-specific data formats. Next, at 410, the metadata building system selects a list of standard terms based on the transaction type of the application-specific data structure. In this example, these terms are "Company Name" and "Part Number", see 420.

At 425, the user selects the terms from the repository of standard terms as, for example, illustrated as 430. At 435, the user graphically relates the selected standard terms to the corresponding terms in the application definition (see 440). Then, at 445 (FIG. 4B), each selected standard term is used as a part of the corresponding metadata packet entry. The metadata packet entry for the data element relating to "Company Name" is illustrated as 450 with the standard term itself shown at 451. At 455, the standard term data is coupled with the application-specific data definition. That is, data format 452 has been stored in the packet entry 450 so that at this point the metadata packet entry 450 contains a standard term correlated to application-specific data format. Next, at 465 the user optionally selects relevant process names from the repository of standard process names which are presented as a list of process names (see 470). These process names will be invoked by a process engine, described in detail below, of the target application. Although this option is available, it is not necessary to include any process names in any metadata packet element. The optional assignment of process names completes the assembly of this exemplary metadata packet entry. In this example, at 475, the system adds user-selected process names to the packet entry 450 (see 453 and 454). The completed metadata packet entry remote process 450 is then included in the appropriate metadata packet which can be retrieved at any time for inclusion in an electronic data transfer or for any other purpose as understood by a person skilled in the art.

Figure 5A:
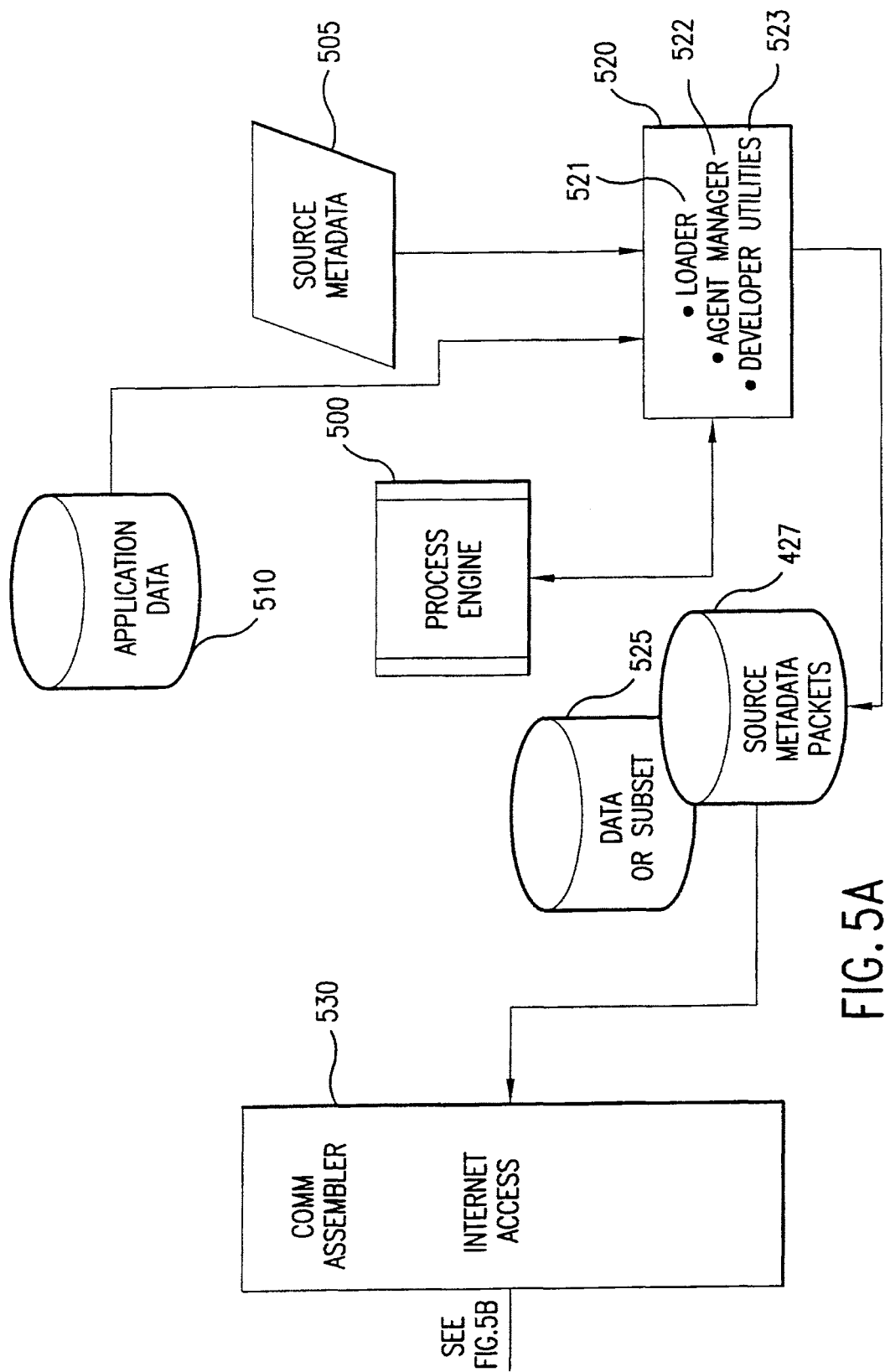
FIGS. 5A and 5B illustrate the configuration of software components facilitating exchange of information of the preferred embodiment.
Figure 5B:
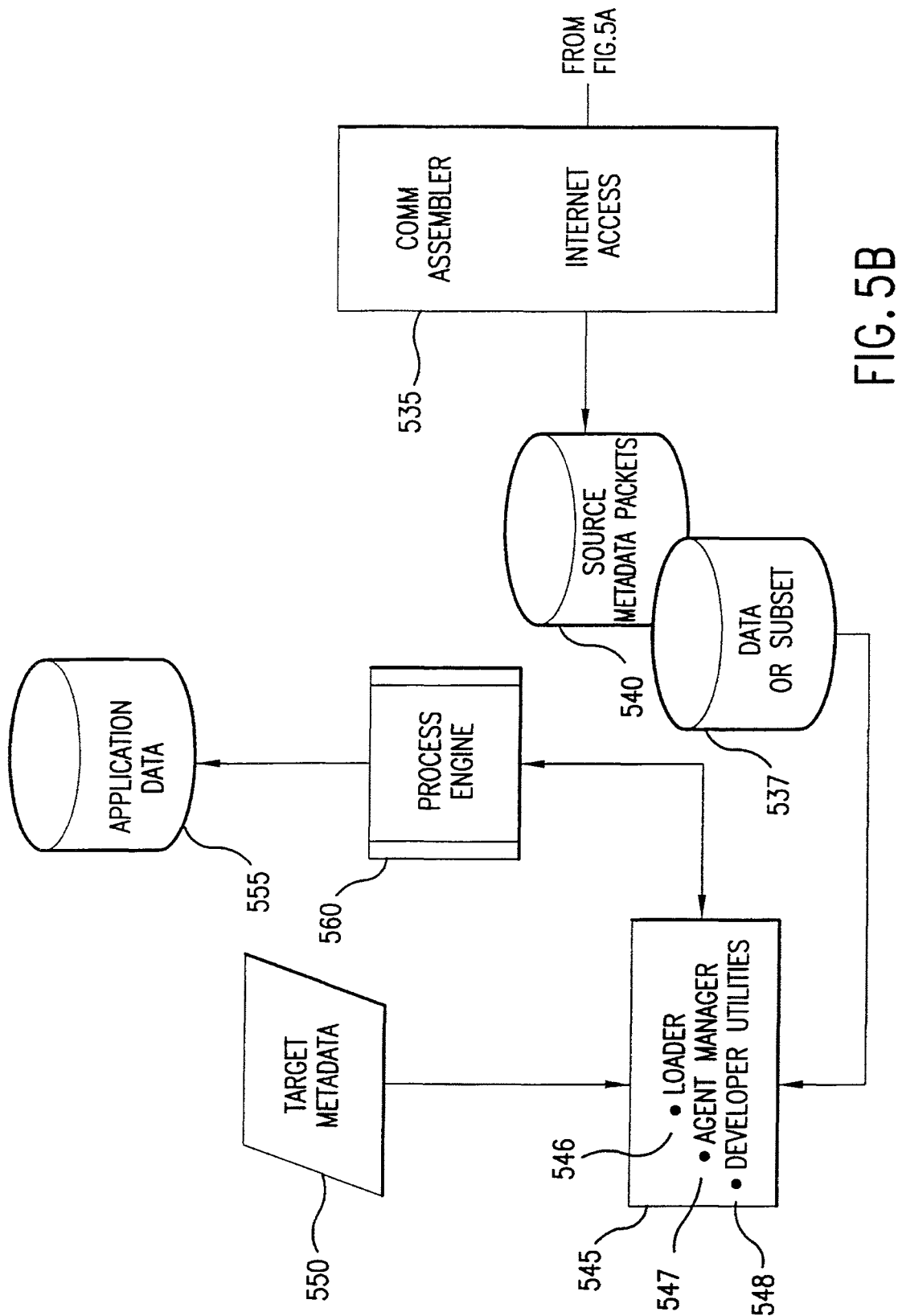

FIGS. 5A and 5B illustrate preferred software configuration supporting data transfer between a source and a target applications. FIG. 5A illustrates the source side and FIG. 5B illustrates the target side of the transfer. In this illustration, each side is a computer system executing the source and target applications respectively. These applications can use incompatible data formats. (As noted, the same methodology can be used for applications that reside on the same system).

Both systems include software components of the preferred embodiment supporting the preferred transfer, receipt and interpretation of data. In this discussion it is assumed that metadata packets have already been built for both applications. Software components illustrated in FIGS. 5A and 5B supporting data transfer and interpretation can be combined into the same process or can be different programs depending on the specifics of a particular implementation as understood by a person skilled in the art. Also, as understood by a person skilled in the art, multiple copies of at least some of the components illustrated in FIGS. 5A and 5B can be employed. Preferably, the software installed at both ends of the transfer include source and target functionality.

In FIG. 5A metadata packets 505 and data structure(s) 510 of the source application are accessed by loader 521 and agent manager 522 illustrated as block 520, to facilitate the packetizing of information to be forwarded via a communications network to the target application. The agent manager software, 522, assures that the correct data has been assembled for the selected function of data transfer. The function refers to the intended use of the data by the target application. For example, the function can be file transfer and the associated data translation, data display, or interaction with a remote process. The agent manager identifies and retrieves the appropriate metadata packets that are needed to describe the data being transmitted for the desired function. The metadata is then stored as shown at 427. The loader 521 records the address information of the target application and retrieves the appropriate data structure(s) of the application 510 for transmission to the target application. In addition, if only a subset of the application data should be transmitted, the loader invokes process engine 500 to isolate the desired subset. The process engine 500 identifies the desired subset using the processing as discussed in connection FIG. 5B depicting the target side. The loader may also invoke third party utility functions 523 to process the data before it is transmitted. The data to be transmitted is stored as illustrated at 525. The loader 521 then combines the metadata packets 427 assembled by the agent manager 522 with the data 525 provided by the application and initiates the communications session. Data encryption and decryption utilities and network routing requests, as known in the art, are also included in the functions supported by the loader 521. One or more files containing metadata packet(s) and the corresponding source data are then transmitted to the target system executing the target application using communication interface 530. The function of the data transmission is also included in the transmitted data. For example, the function can be identified as DT-file transfer and data translation; DP-data display; RP-interaction with a remote process.

The preferred software components executing at the target system are illustrated in connection with FIG. 5B. As noted, software components supporting the preferred data transfer and receipt are preferably included in a single package. Thus, although these software components are shown under different reference numbers in FIG. 5B, they are preferably a different copy of the software which support both the transfer and receipt capabilities.

At the target system, the source data and metadata packets are received at communication interface 535. See FIG. 5B. The received data and metadata, as illustrated at 537 and 540, respectively, are disassembled and stored for further processing by the loader 546. In the capacity of a recipient, the loader 546 and agent manager 547 collectively illustrated as 545 perform additional functions discussed below.

The agent manager of the target system validates the existence of a function supported by the target application for which the data transfer was received. It should be noted that different applications use the received data in different ways. An application may read the received data as a file, or display the data, or use it to interact with a remote process (e.g., to supply parameter/task list to a remote process), or use it for another purpose as known in the art. As noted, this intended use of the data is referred to as the function of the transmitted data. The loader 546 preferably maintains a function queue where it enters the function of incoming data and its storage location. The agent manager retrieves metadata packets (see 550) of the target application that correspond to the received packets on the basis of the transaction type of the transmitted data, and invokes the appropriate portion of the process engine, illustrated as 560, to perform data conversion for the indicated function.

The source data, originating at 510, is converted in accordance with the target metadata specification 550 to the target application data 555. The data conversion process at the target system employs an output-driven mapping process. That is, first the terms in the target application are selected and then matched with the terms employed by the source as discussed in more detail below.

FIGS. 6A-D and 7A-C illustrate the processes performed by the loader, agent manager, and process engine at the receiving end. It should be noted that, as understood by a person skilled in the art, these modules can be implemented as three separate programs, or may be combined into a single program or partitioned in any other way known in the art. Also, as noted, multiple copies of these components can be employed. A person skilled in the art will choose an appropriate configuration for a given implementation.

Figure 6A:
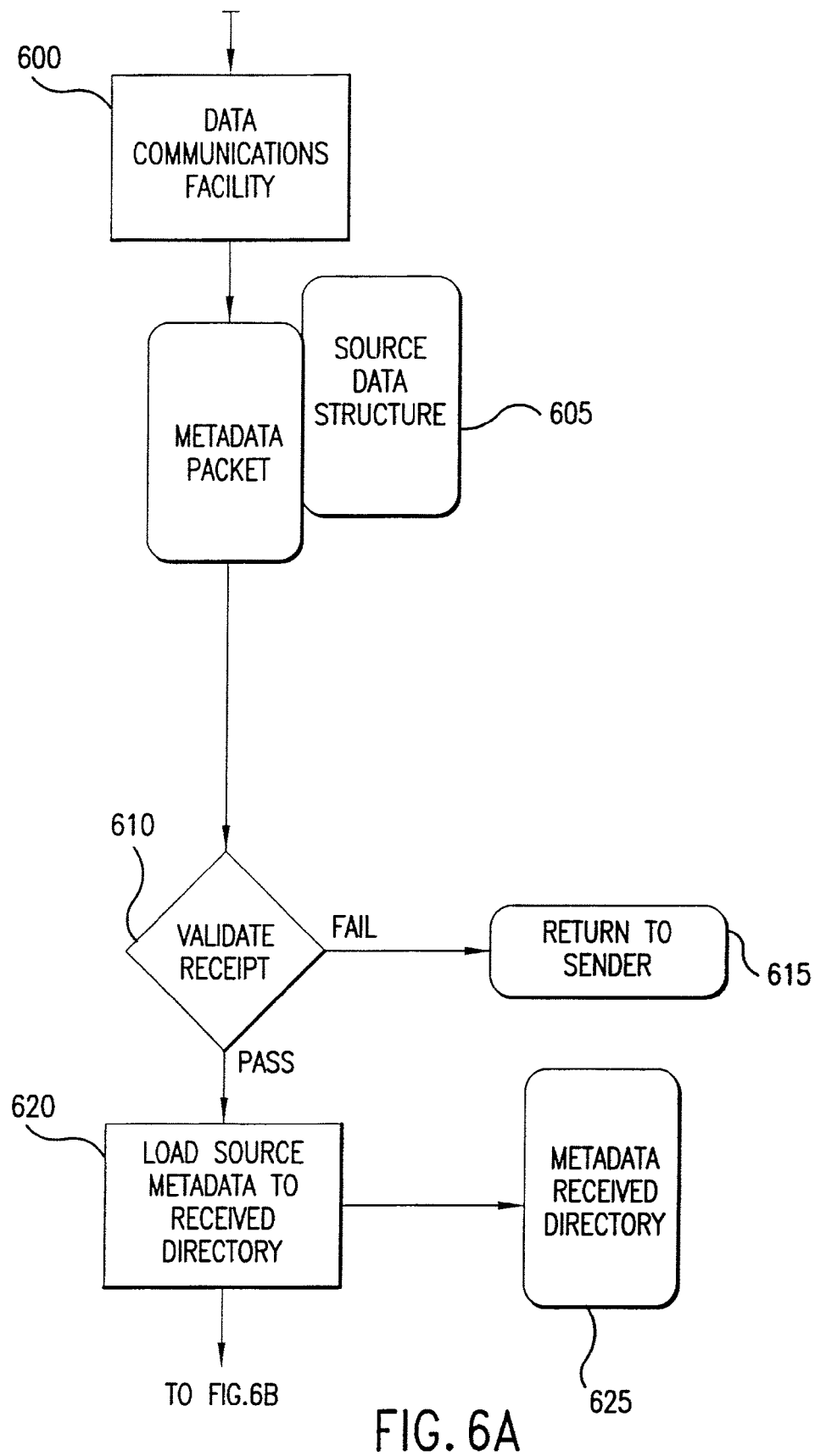
FIG. 6A-D illustrate the operation of the loader and agent manger.
Figure 6B:
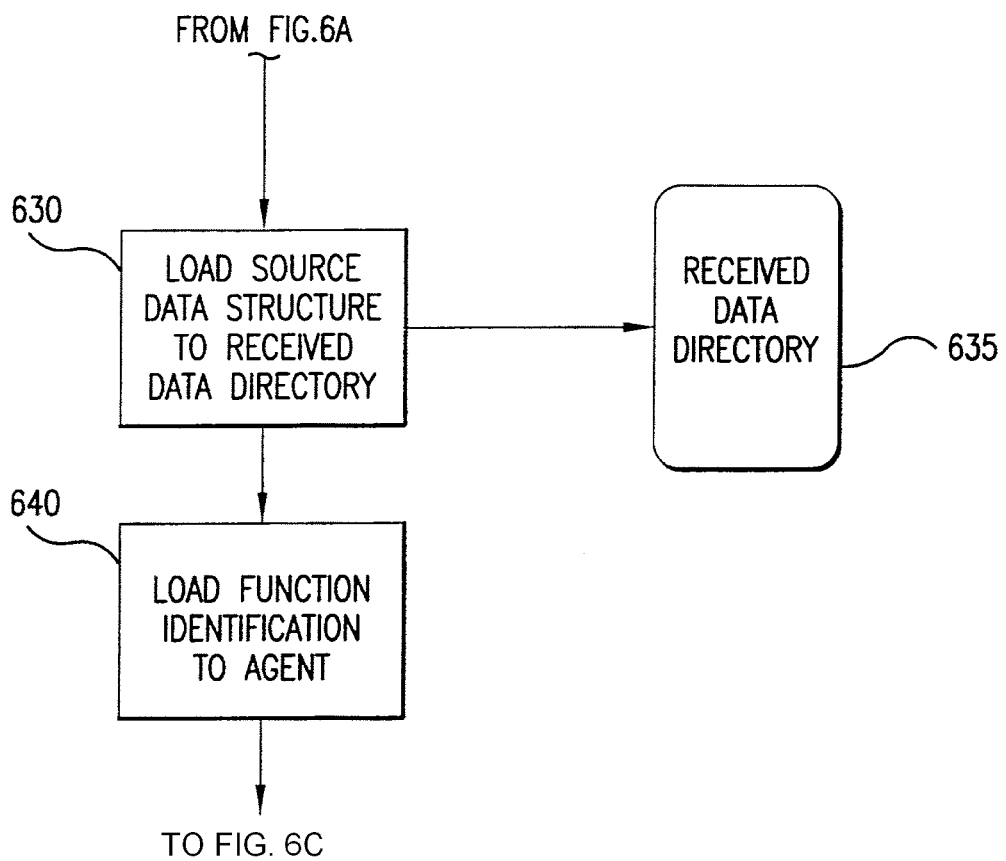

The processing illustrated in FIG. 6A begins at 600 wherein the target data communications facility (e.g., 535) receives metadata packets and source data structures (see 605, see also, 537 and 540 in FIG. 5B). Upon arrival at the target system, the received metadata packets and associated data structures of the source application are examined by the loader 546 so as to determine that the information has been properly received. Thus, flow of control is transferred to 610 where proper receipt of the data transmission is validated (see 610). If an error is detected, an appropriate message identifying the error is returned to the sender (see 615). The loader module also performs decryption, if necessary, as well as any additional tasks that are needed to properly receive the transmitted data, as known in the art. Each metadata packet received from the source application is then stored in the received metadata directory of the target system (see 620 and 625). The received source data structures are stored in the received data directory at the target system (see 630 and 635 of FIG. 6B). The loader also determines the function of the transmitted data (e.g., file transfer and data translation, display, interaction with a remote process). As noted, the target computer may have various applications that receive data transmitted from external sources. After the loader has determined the function of the received data, this function and the identification of the storage for the received data are entered in the function queue. When the requested function has been identified and added to the queue the loader invokes the agent manager (see 547 in FIG. 5B). As understood by a person skilled in the art, the system may maintain several queues between the loader and agent manager.

Figure 6C:
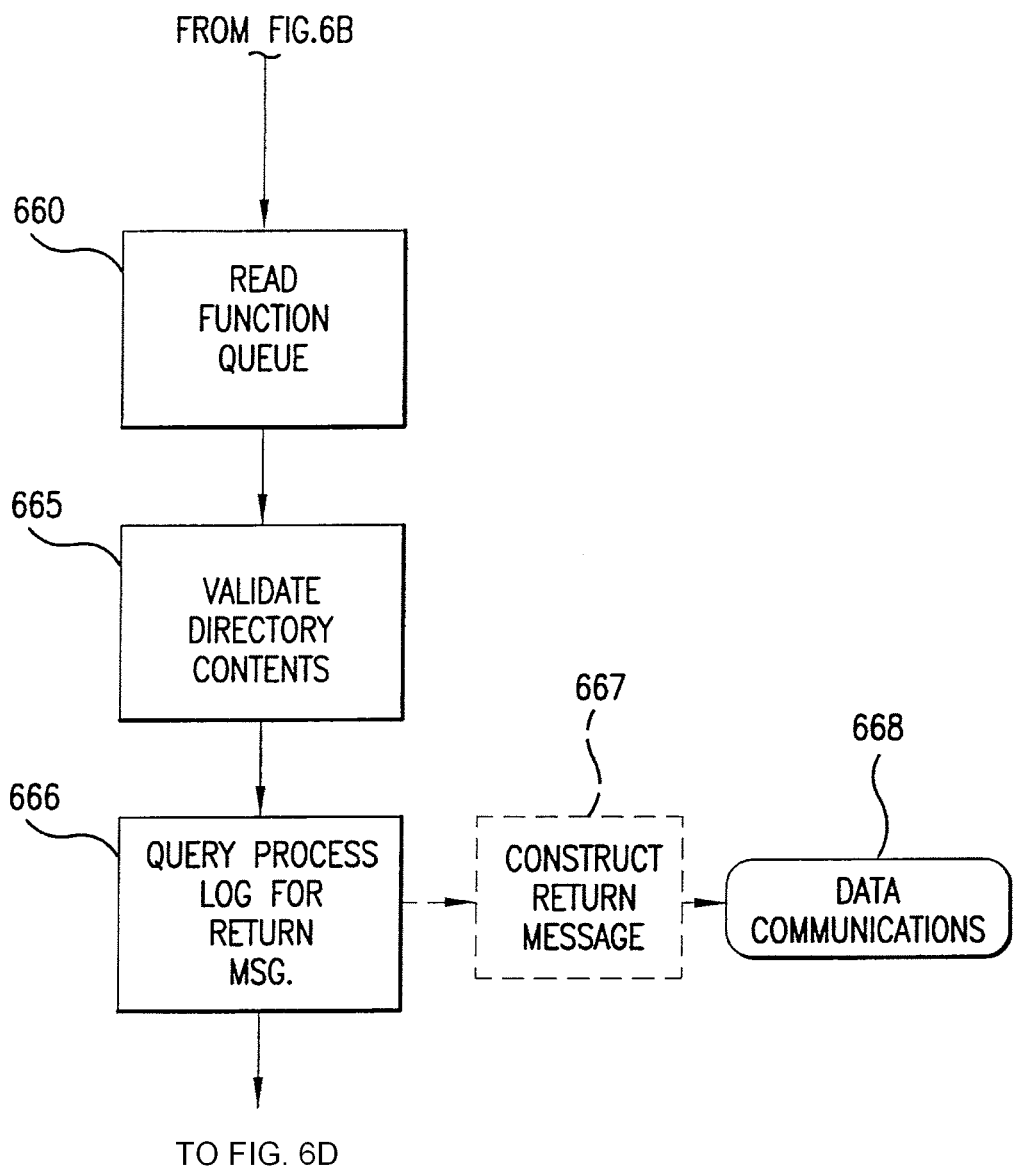
Figure 6D:
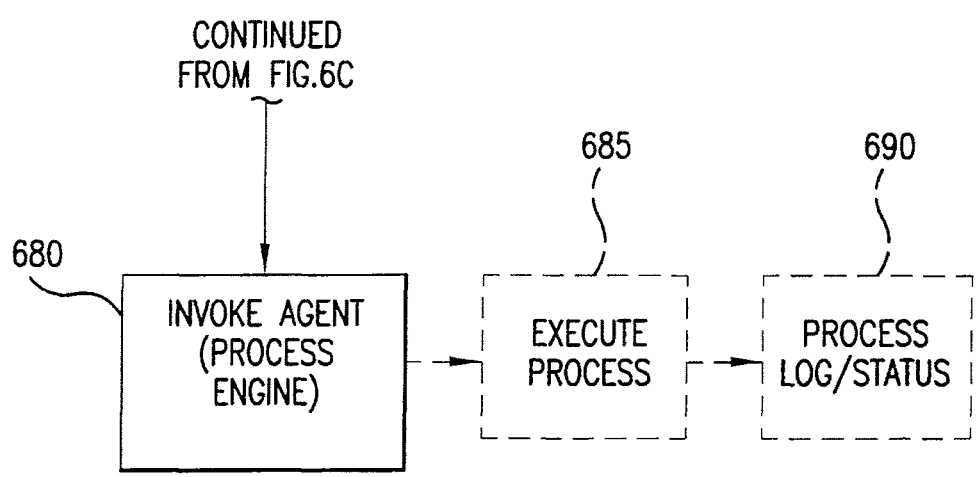

Referring to FIG. 6C, the agent manager reads function queue at 660 and retrieves validation criteria for the received data based on its function. The agent manager then retrieves received information from the data directly in accordance with the specification provided in the queue and, at 665, validates that the received information meets the requirements needed to assure proper deployment of resources for further processing. If invalid data has been detected, the source application is informed accordingly by a return message (see 666-668). This validation of the received data and metadata is preferably performed upon the receipt of data because the data conversion process can be performed at a later time, not necessarily upon receipt. Thus, if an error is detected, the source has to be notified while it retains information about the particular data transfer.

After the received data has been validated, the agent manager invokes the capabilities of the process engine in accordance with the function of the received data (see 680 and 685 in FIG. 6D) and initiates a session monitor process (see 690) to record statistics and log exceptional activity during the operation of the engine. The execution of the agent manager is then returned to block 660 (FIG. 6C) where it continues to handle new data.

Figure 7B:
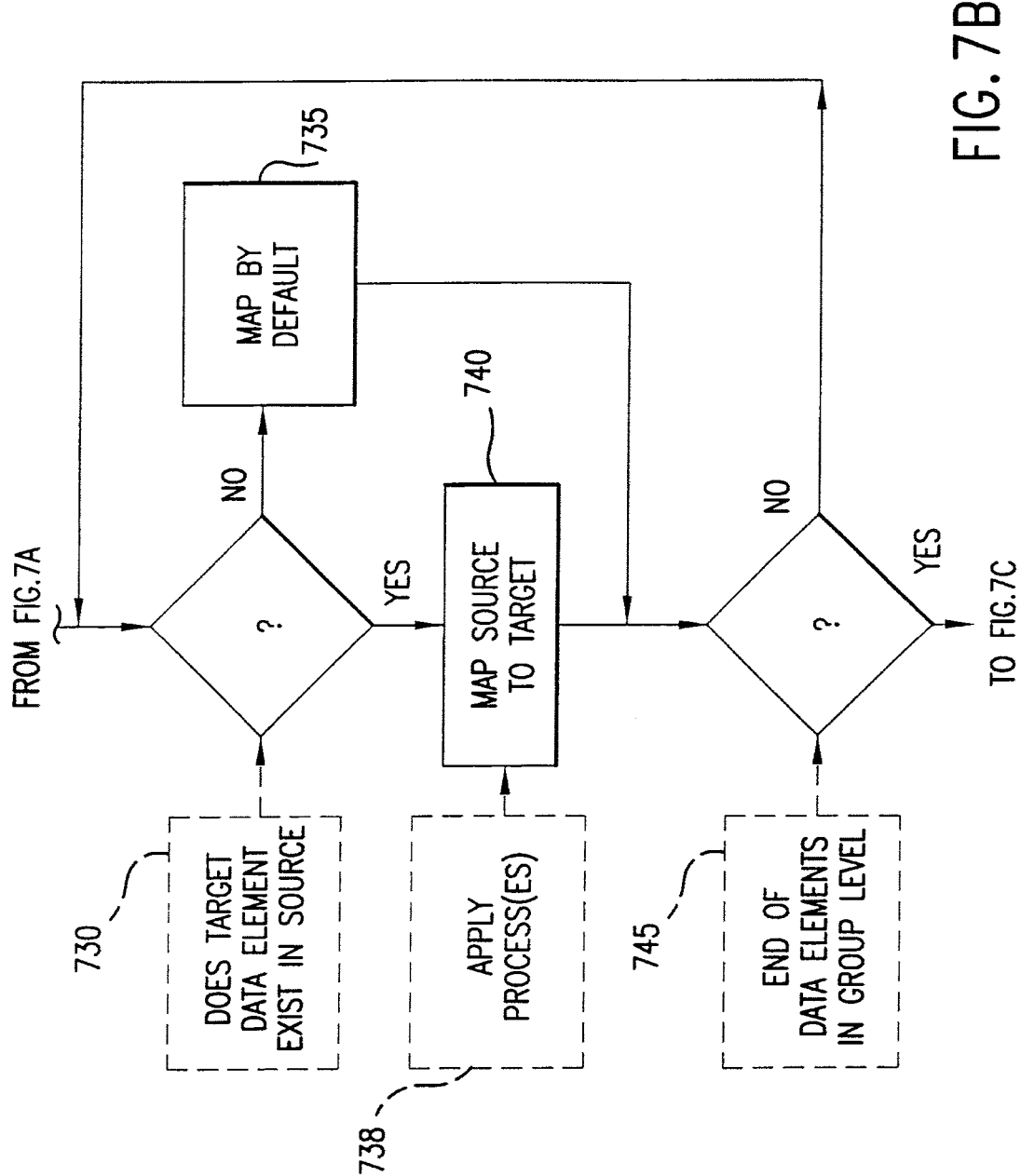
Figure 7C:
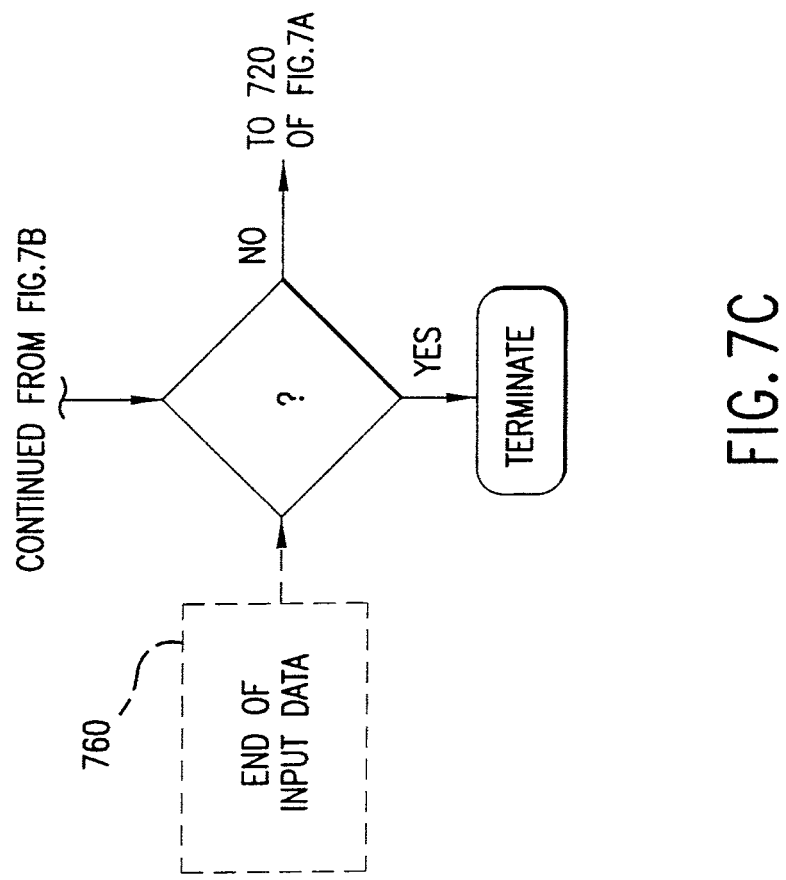

The operation of the process engine for each received metadata packet and the associated application-specific data is illustrated in FIGS. 7A-C. The process engine 560 (FIG. 10) loads a source metadata packet (see 700), the corresponding target metadata packet (see 705) and the corresponding transmitted source application-specific data (see 710). The corresponding source and target metadata packets are selected based on the source packet transaction type. Then, the process engine 560 (FIG. 10) performs data conversion by mapping hull to the target data structure from the received source data structure.

A metadata packet includes one or more entries specifying data elements and optionally, it may also include one or more group level definitions. The group level definitions are file headers and other information of a general nature. If they are used, group level definitions appear in the beginning of the packet. Each of the definitions corresponds to one or more entries representing data elements that appear thereafter. The entries representing data elements belonging to a group level definition can be ascertained from the group level definition. It should also be noted that a metadata packet preferably (but not necessarily) includes a transaction type of the packet.

In the discussion below, the processing of the process engine 560 (FIG. 10) is illustrated assuming that the packets include one or more group level definitions. This processing technique can be modified by a person skilled in the art for other conventions used in packet construction.

At 720 the process engine determines if a given group level definition entry in the target packet exists in the transmitted source metadata. If the definition does not exist, at 725, the default data is provided as target data for the data elements of this group level definition. If the given group level definition entry has been found, the packet entries corresponding to the group level definition are identified and the source data elements (if they exist) are converted based on the metadata. If at 730, a target metadata packet entry does not exist in the source packet, default mapping (735) is performed. That is, default data is provided for the missing data element corresponding to the missing metadata entry. Otherwise, the target packet entry and the corresponding source packet entry are used for mapping the source data element to the target data (see 740). That is, the source data is converted to the target data representation. As a part of the mapping process, the process engine 560 (FIG. 10) may execute one or more processes specified by metadata as illustrated at 738. In the event of default mapping as discussed above, the default processing functions may also be applied.

More specifically, at 745 the process engine checks if additional metadata packet entries of the target packet belong to the group level definition that is currently being processed. In other words, at 745 it is checked if additional target data elements that have not been processed belong to this group level definition. If so, flow returns to 730 and the next data element corresponding to the next target metadata entry is processed. Otherwise, the system checks at 760 whether additional group level definitions exist and, if so, flow returns to 720 to process the data elements corresponding to the next group level definition entry. Otherwise, the conversion process terminates.

It should be noted that if metadata does not employ group level definition, the metadata entries can be processed sequentially so as to create data elements for input to the target application. In this case, as discussed before, the process is driven by the target metadata so that the target entries are created either by default mapping if the corresponding source elements do not exist or by data conversion from the source data element to the target data element based on the corresponding metadata packet entries.

Because the metadata entries of the target application are considered first, this procedure assures integrity of results, i.e., that all the necessary elements of the target data are specified when the data is provided to the target application. The target-driven execution as discussed herein assures that the preferred method is applicable to a wide range of applications.

FIGS. 8 through 11 provide an example of the operation of the preferred embodiment described generally from a user perspective. User 800 in FIG. 8 wishes to transmit a purchase order represented consistently with a purchase order file specification of his/her source application. Therefore, to use the preferred system and method the user needs to build metadata packets for this purpose. These packets then would support a multitude of subsequent purchase order transmissions. To build appropriate packets, first, user 800 enters into his/her system application-specific data structures preferably using the graphical user interface (see 210 in FIG. 2) as discussed above. In this example, the purchase order file specification (i.e., the purchase order data structure) of the source application of the user 800 is illustrated at 820. In this example, data structure 820 includes several fields of data identified by "Field Name" (e.g., "Comp. Name"), and each field is encoded using the source-application-specified format defined as "Offset" and "Length". As discussed above, the entry of the application data structure is preferably supported by visual and textual prompts. Although this example shows a specific data structure formatted in a specific way as understood by a person skilled in the art, the preferred system and method is not limited to any specific data representation or any specific use of data (e.g., transaction types).

Next, the user assigns standard terms, illustrated as 825, from the repository 103 to the application-specific definitions 820. Preferably, this is done by the system displaying a list of standard terms and a user associates them with the names used in the application preferably with a pointing device. It should be noted that the terms and process names of the preferred standard do not include synonyms so that each term uniquely identifies the corresponding data type, even though synonyms may exist in a data structure of a given application. As discussed above, the displayed standard terms are preferably selected based on the transaction type of the application-specific data structure, which in this example is a purchase order.

To facilitate the terms assignment process, a list of terms commonly found in user environments may be displayed to a user in connection with each standard term. As noted, to assure unambiguous interpretation during the data conversion process, the standard has only one name for each supported data element. For example, "Company Name" (see 825) is the name adapted by the standard. The corresponding data elements used by applications may have different names. For example, in the applications illustrated in connection with FIGS. 8 and 9, "Comp. Name" (see 820) and "Co. Name" (see 915) have the same meaning as "Company Name." The names employed by the applications (see, e.g., 820 and 915) may appear in a synonym list provided in connection with a given standard term, e.g., "Company Name". This list is used as a tool facilitating the correlation of the standard and application-specific names, but, as noted, the standard itself does not have synonyms.

During the process of matching standard and application-specific terms, the user may also assign process names from the standard repository 108 to selected metadata packet entries. An example of such standard process names is illustrated as 828. The resultant metadata entries of this example are illustrated as 830. They form a metadata packet for the purchase order transaction type. The packet entries include standard data names, application-specific data formats and optionally selected standard process names. Thus, application-specific data structure 820 has been represented in the metadata such that it can be readily understood by other applications having access to the standard repositories 103 and 108.

Figure 8:
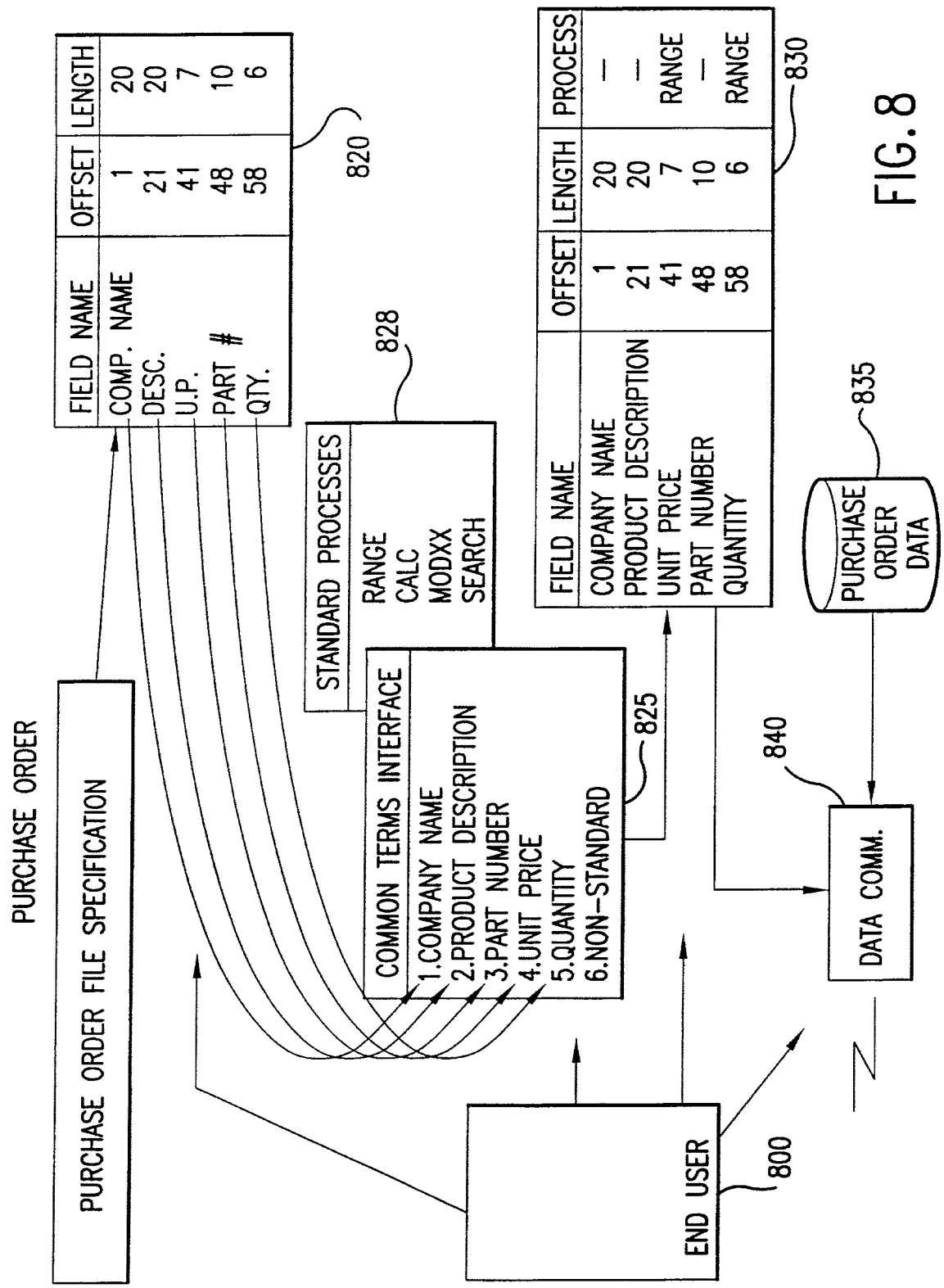
FIGS. 8 and 9 provide examples of how metadata packets are constructed.

As part of data transfer, the generated metadata packet 830 is then passed to the system network facility generally illustrated in FIG. 8 as 840 by the agent manager and loader as discussed above. The application-specific data of the source application is illustrated in this example as 835 and it is also passed to the network facility by the loader as discussed above. Also, a user of the source application may choose to forward a subset of the output information to the target application. As noted previously, the subset may be produced by invoking the process engine to generate the subset using the steps typically performed in connection with the target application. Also as noted previously, the present method and system can be used for processing data within one system, and not only for the purpose of exchanging data between systems. In this example, the purchase order transaction type associated with the data structure at issue in FIG. 8 belongs to the class ORDER, which includes a pair of transaction types: purchase order and order entry (see FIG. 12 and the associated discussion).

Figure 9:
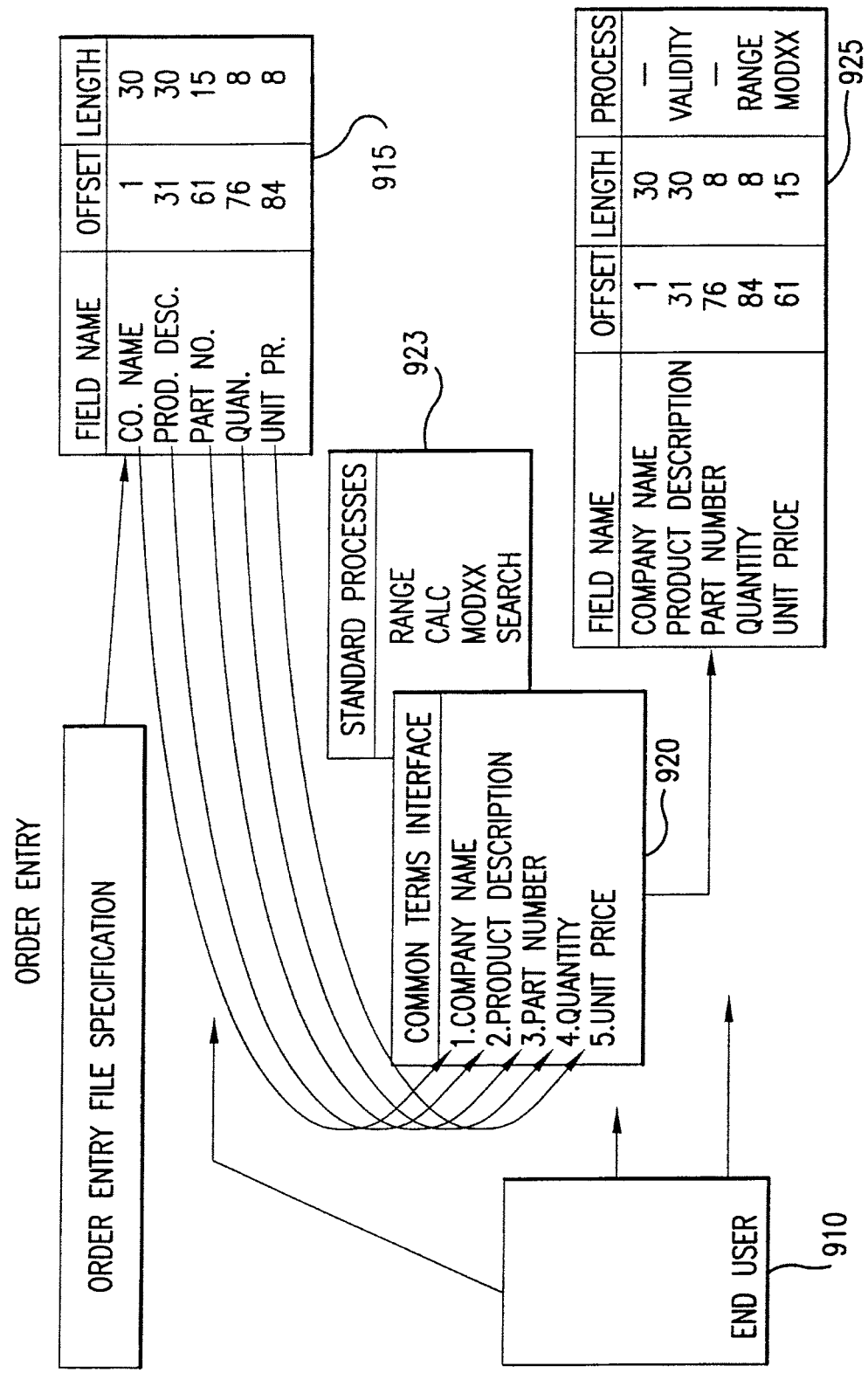

The recipient of the purchase order also has built its metadata packet that specifies the data accepted by an order entry application. As illustrated in FIG. 9, user 910 defined application-specific data structure shown at 915 using the procedure discussed above. The standard terms and process names used for order entry are illustrated at 920 and 923. In this example, using the procedure discussed above, the target system built metadata packet 925.

Figure 10:
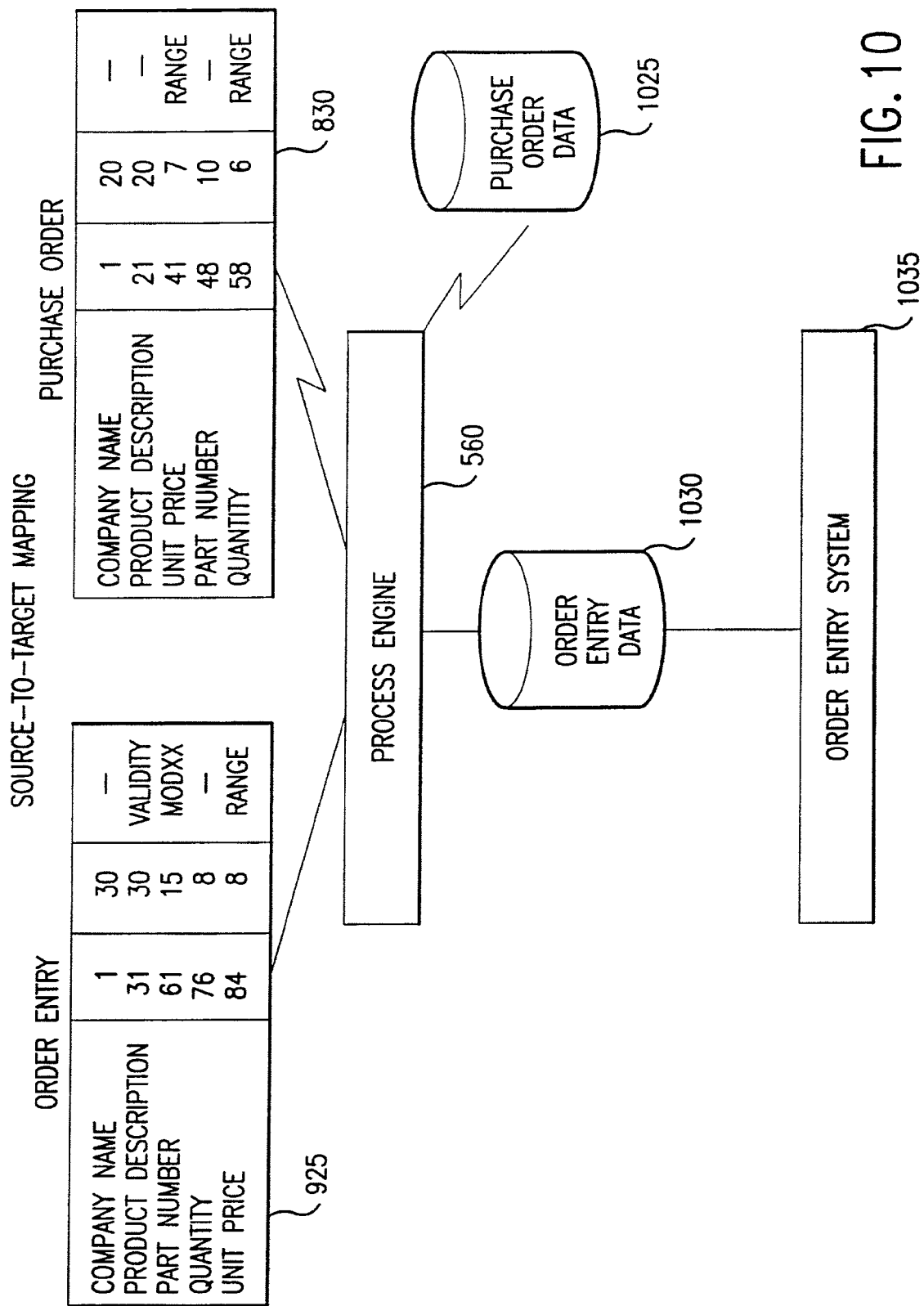
FIGS. 10 and 11 illustrate an example of a data transfer in accordance with the preferred embodiment.

FIG. 10 illustrates metadata packets for the source (purchase order) 830 and the target (order entry) 925. As apparent from this illustration, the commonality of terms, not formats, facilitates successful-data conversion. Thus, using the output-driven method (i.e., the method where target metadata is considered first), as discussed above, the process engine converts the received purchase order data structure in the format of the source application into the structure compatible with the order entry input of the target application. As a result, incompatible data was transmitted, received and used by the target application without any translation performed by the source system.

Figure 11:
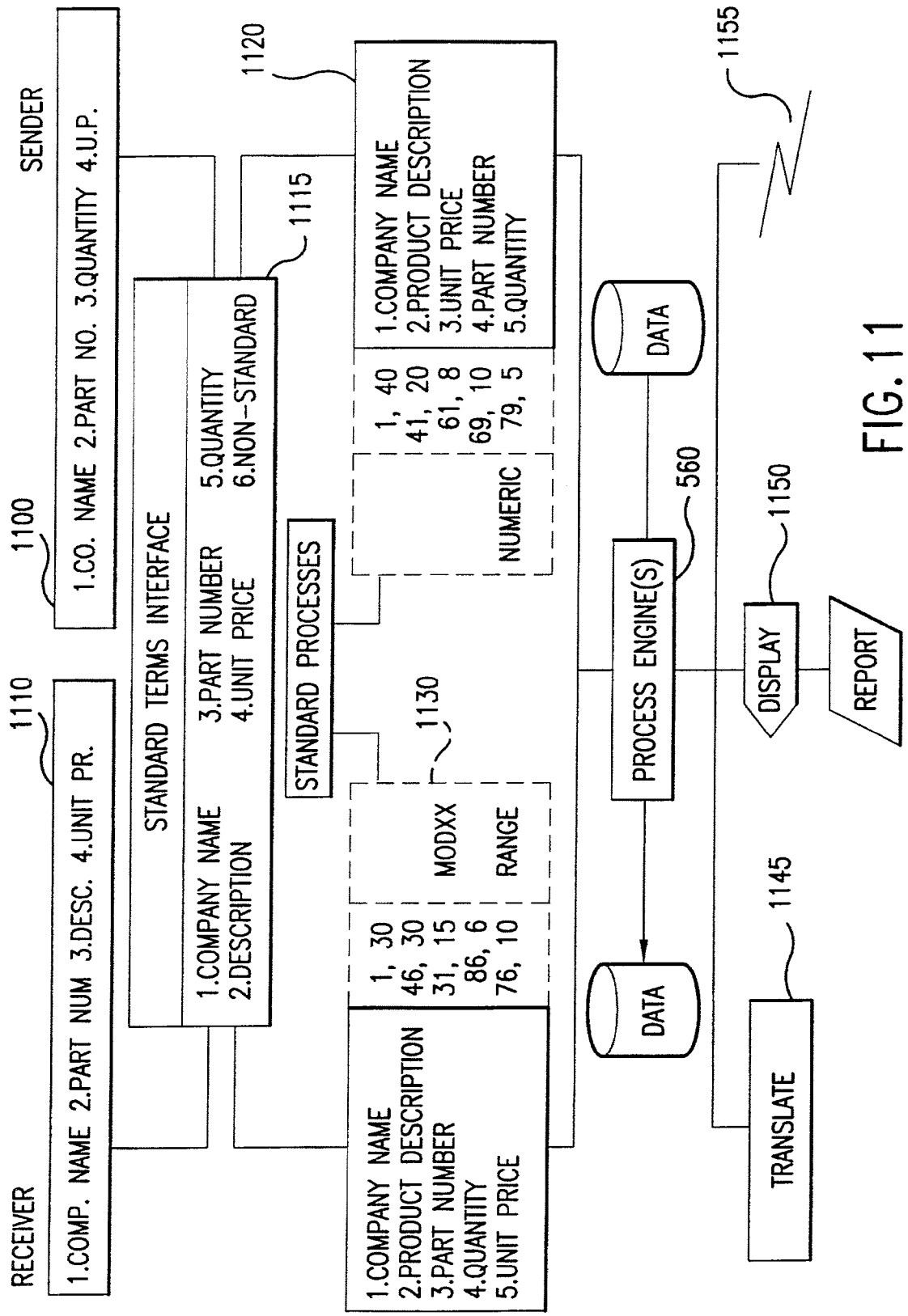

As summarized in FIG. 11, the source (sender) application 1100 and the target (receiver) application 1110 were enabled to consummate an electronic delivery of data without disturbing their respective native environments. Thus, the preferred methods and system facilitates conducting a trading event using a standard language 1115 and performing the requisite data validation and manipulation processes, see, e.g., 1120 and 1130. The process engine has converted the source data structure into the data representation required by the target application. Metadata received by the target application can be interpreted so as to facilitate file translation (see 1145), deliver information to a web site (see 1150), initiate and direct remote processing operations (see 1155) or perform any other functions conceived by application developers.

It should be noted that purely lexical qualities of the preferred standard simplify the exchange and proper interpretation of data. Other than consistency of vocabulary, there are no other requirements with respect to transmitted data so that, for example, format, structure, context, and manipulation remain the properties of application environments. That is; data representation of the application environment is not effected. Thus, in the preferred embodiment, it is possible to readily envelope, transport and transform information between diverse applications.

Figure 12:
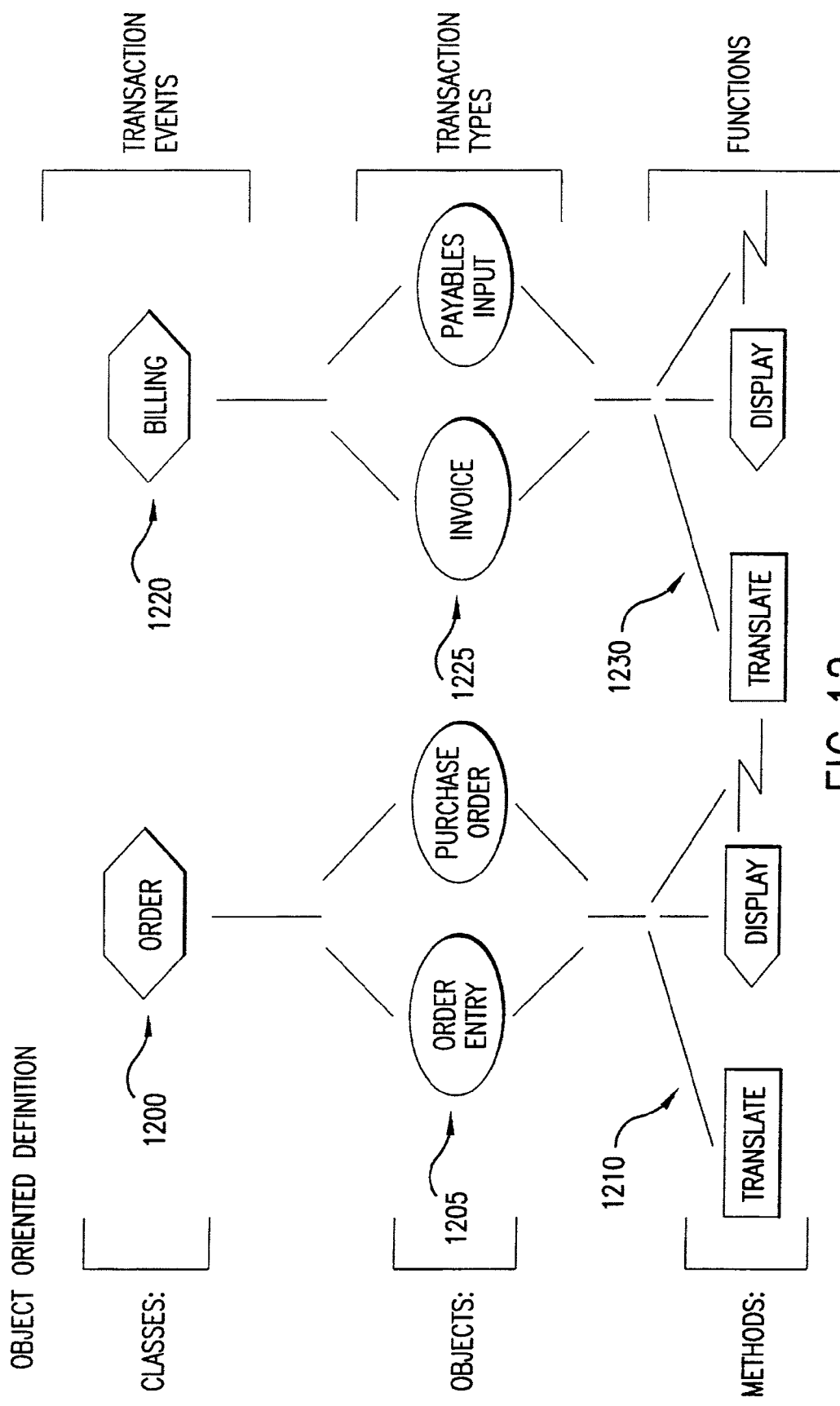
FIG. 12 illustrates the manner in which object technology can be used to establish a convention for ordering relationships between transaction types and trading events.

FIG. 12 provides an example of how object technology can facilitate the implementation of the preferred embodiment. Electronic transactions have structural elements that can be defined in object-oriented terms. An example of such an object definition is as follows:

| | | |
|---|---|---|
| Transaction Events | ----> | Object Class |
| Standard Order | | |
| Transaction Type | ----> | Object |
| Purchase Order/Order Entry | ----> | Object Property |
| Buyer/Seller | ----> | Object Property |
| Sender/Receiver | ----> | Object Property |
| Source/Target | ----> | Object Property |
| National Language | ----> | Object Property |
| Transaction Process | ----> | Object Method |

A transaction set describes transaction types that are used to conduct a specific event between trading partners. In the example provided above, the purchase order issued by the system of FIG. 8 and the order entry data generated by the system of FIG. 9 are complementary components of the transaction set, Standard Order. As discussed above, the properties associated with transaction types provide a consistent definition of the trading relationship across a variety of trading events. Functions and operations performed on transaction types correspond to the application of methods to objects. Data elements (fields, character strings, bit maps, etc.) within transaction types are processed by the process engine and/or by external methods invoked by it.

As understood by a person skilled in the art, the terminology of this specification should be interpreted broadly. For example, the term "data structure" should not be construed as a data structure of a specific language or system because it generally relates to any collection of items of information (e.g., data elements). Similarly, "metadata" generally relates to any data describing other data as understood from the previous discussion. It is also understood that a metadata packet broadly defines a collection of information (e.g., a data structure) and each entry in the packet describes an item of information in such a collection. The data formats of various application data structures and the like should also be construed broadly as any data representations as understood by a person skilled in the art. Other terminology employed herein (for example, applications, process, system, transaction type, communication, function, etc.) should also be interpreted broadly as understood by a person skilled in the art.

The present invention is riot to be limited in scope by the specific embodiments described herein. Indeed, modifications of the invention in addition to those described herein will become apparent to those skilled in the art from the foregoing description and accompanying figures. Doubtless, numerous other embodiments can be conceived that would not depart from the teaching of the resent invention, whose scope is defined by the following claims.

The invention claimed is:

1. A method comprising the steps of:
building a metadata packet, consisting exclusively of metadata, for transmitting source data having a representation consistent with a source application having an application-specific unconverted file data format to a target system, the representation defined by the metadata packet, the building step comprising the steps of:
storing application definition for the source data comprising application-specific names and application-specific data formats;
matching the application-specific names in the definition to standard names, wherein the matching includes using a graphical user interface;
creating said metadata packet from the matched standard names;

storing the created metadata packet entries each of which comprises a name selected from the standard names and one of the application-specific data formats;

and storing at least one standard process name as part of the metadata packet entries;

wherein the steps of building, storing application definition, matching, creating, and storing at least one standard process name are performed by a central processing unit and using memory storage; and wherein the representation of the source data is unconverted during transfer and does not require conversion or assembly at the target to retrieve the file data.

2. The method of claim 1 wherein the step of matching comprises the step of:

selecting a standard term correlated to a corresponding term in the stored application definition.

3. The method of claim 2 wherein the step of matching comprises the step of:

selecting a process name from a repository for entry in said metadata packet.

4. A system, comprising: a processing unit and a memory storage unit, the processing and storage units for building a metadata packet, consisting exclusively of metadata, for transmitting source data having a representation consistent with a source application having an application-specific unconverted file data format to a target system, the representation defined by the metadata packet comprising:

storing application definition of said source data comprising application-specific names and application-specific data formats;

matching the application-specific names in the definition to standard names wherein the matching includes using a graphical user interface;

creating said metadata packet from the matched standard names; and storing the created metadata packet, which comprises a name selected from the standard names and one of the application-specific data formats;

storing at least one standard process name as part of the metadata packet entries;

displaying suggested names that may correspond to one of the standard names;

and wherein the representation of the source data is unconverted during transfer and does not require conversion or assembly at the target to retrieve the file data.

5. The system of claim 4, further comprising a standard term correlated to a corresponding term in the stored application definition, the standard term selected using the graphical user interface.

6. The system of claim 5, further comprising a repository having stored therein at least one standard process name adapted to be invoked by a application; and wherein the graphical user interface further includes: means for selecting a process name from said repository for entry in said metadata packet using the graphical user interface.

7. A method comprising the steps of:

communicating source data from a source system to a target system wherein the source system and the target system have incompatible application-specific data formats, establishing a repository of standard names and processes correlated to application-specific names, processes and application-specific data format of the source data;

retrieving the source data having a representation consistent with a source application having an application-specific unconverted file data format, the representation defined by a source metadata packet;

creating the source metadata packet, consisting exclusively of metadata, corresponding to the source data from information in the repository, wherein the source metadata packet includes at least one entry comprising a standard name corresponding to at least one name used by the source application and a definition of a related data representation used by the source application, wherein the creating step comprises the step of: storing at least one standard process name as part of the metadata packet;

transmitting the source data having the application-specific unconverted file data format and the source metadata packet to the target system;

wherein the representation of the source data is unconverted during transfer and does not require conversion or assembly at the target to retrieve the file data; and wherein all steps are performed using a central processing unit.

8. The method of claim 7 wherein the creating step includes the step of: selecting a standard term correlated to a corresponding term in the repository for entry in said metadata packet.

9. The method of claim 8 wherein the creating step further includes the step of selecting a process name from said repository for entry in said metadata packet.

* * * * *